United States Patent [19]

Fukushima et al.

[11] Patent Number: 4,522,955

[45] Date of Patent: Jun. 11, 1985

[54] HIGHLY FOAMED POLYPROPYLENE PRODUCT AND AN EXTRUSION PROCESS FOR FORMING THE PRODUCT

[75] Inventors: Nobuo Fukushima, Otsu; Yoshihiko Kitagawa, Toyonaka; Takuzo Okumura, Ibaraki; Kazuaki Sakakura, Moriguchi, all of Japan

[73] Assignee: Sumitomo Chemical Company, Limited, Osaka, Japan

[21] Appl. No.: 379,878

[22] Filed: May 19, 1982

[30] Foreign Application Priority Data

May 29, 1981 [JP]  Japan ................................ 56-83316

[51] Int. Cl.$^3$ ............................................. B29D 27/00
[52] U.S. Cl. .................................... 521/143; 264/53; 264/DIG. 16; 521/79
[58] Field of Search ................... 264/DIG. 16, 53, 51; 521/43, 79

[56] References Cited

U.S. PATENT DOCUMENTS

| | | | |
|---|---|---|---|
| 3,188,295 | 6/1965 | Ballast et al. | 264/DIG. 16 |
| 3,214,234 | 10/1965 | Bottomley | 264/DIG. 16 |
| 3,250,730 | 5/1966 | Palmer | 264/DIG. 16 |
| 3,250,731 | 5/1966 | Buhl et al. | 264/51 X |
| 3,303,045 | 2/1967 | Newman | 264/DIG. 16 |
| 3,607,796 | 9/1971 | Eberle et al. | 264/DIG. 16 |
| 3,663,668 | 5/1972 | Fairbanks | 264/DIG. 16 |
| 3,679,538 | 7/1972 | Druin et al. | 264/DIG. 16 |
| 3,810,965 | 5/1974 | Sen et al. | 264/DIG. 16 |
| 3,830,900 | 8/1974 | Winstead | 264/DIG. 16 |
| 4,054,550 | 10/1977 | Parker et al. | 264/DIG. 16 |

OTHER PUBLICATIONS

Van Raamsdonk, G. W., "Technological Aspects of Polypropylene Processing", in *German Plastics Digest*, part of *Kunststoffe*, vol. 51, (May 1961), pp. 10–14; 269–276.

*Whittington's Dictionary of Plastics*, by Lloyd R. Whittington, Stamford, Conn., Technomic, ©1968, pp. 179–181.

Brydson, J. A., *Flow Properties of Polymer Melts*, London, Iliffe Books, ©1970, pp. 160–166.

*Primary Examiner*—Philip Anderson
*Attorney, Agent, or Firm*—Stevens, Davis, Miller & Mosher

[57] ABSTRACT

A process for producing a highly expanded polypropylene foam which is uniform in viscosity during extrusion foaming, improved in melt strength and free from unevenness of surface by using a polypropylene resin having a specified melt tension.

6 Claims, No Drawings

HIGHLY FOAMED POLYPROPYLENE PRODUCT AND AN EXTRUSION PROCESS FOR FORMING THE PRODUCT

This invention relates to an improved process for producing polypropylene foam.

More particularly, it relates to a process for producing a highly expanded polypropylene foam having uniform and fine cell structure.

Since polypropylene has a high crystallinity and a low melt viscosity and is difficult to cross-link, it has hitherto been quite difficult to obtain a highly expanded product therefrom. As such kind of product, radiation-crosslinked foam-sheet is the only one commercially available today.

However, since polypropylene is superior to polyethylene in heat resistance, polypropylene is expected to become useful in the field requiring a heat resistance of 100° C. or higher, such as heat-insulating material for hot water piping, if a highly expanded product can be obtained therefrom with relative inexpensiveness by the non-crosslinking extrusion foaming process similarly to polyethylene.

Thus, the present inventors started a study with the aim of developing a technique for producing a highly expanded product of polypropylene by the non-crosslinking extrusion foaming process. In the course of this study, the present inventors encountered the following two problems: (1) the breakage of cells during the foaming and (2) the occurrence of uneven foaming which results in an uneven surface of the expanded product.

Since these problems were not found in the foaming process of polyethylene, the inventors measured the characteristic properties of molten polyethylene and molten polypropylene and, the crystallizing behaviors of these polymers, etc. to investigate how these two polymers were different from each other in these properties. As the result, it was found that they were different in melt tension (melt strength) behavior.

Thus, it was found that low density polyethylene has a high melt tension and a narrow variation thereof, while polypropylene generally has a low melt tension and wide variation thereof.

Watching this melt tension behavior, the inventors studied the relation between melt tension value and failure in polypropylene foaming process to find that the breakage of cells during the foaming occurred in cases of low melt tension value and that appearance of uneven surface by uneven foaming occurred when there is wide variation of melt tension.

In view of above, polypropylenes having various values of melt tension were prepared and their foaming processings were tentatively carried out. As the result, it was found that a uniform foaming could be effected without breakage of cells and a foamed product free from unevenness of surface could be obtained when a polypropylene having a minimum melt tension not smaller than a definite value and having a narrow variation of melt tension was used.

Thus, this invention provides a process for producing a polypropylene foam characterized by feeding, into an extruder, a polypropylene resin having a minimum value of melt tension of 3 g or more at 190° C. and a maximum/minimum ratio of melt tension of 2.5 or less together with a nucleus-forming agent, melting and plasticizing them, thereafter feeding a volatile foaming agent through the cylinder of extruder, uniformly mixing the materials, and then extruding the mixture to the low pressure zone while cooling it.

The polypropylene resins usable in this invention are resins composed mainly of polypropylene of which the minimum value of melt tension is 3 g or more, preferably 5 g or more, at 190° C. and of which maximum/minimum ratio of melt tension is 2.5 or less and preferably 2.0 or less. Said resins include isotactic polypropylene, ethylene-propylene block copolymer, ethylene-propylene random copolymer and mixtures of two or more kinds of the above-mentioned polypropylene type resins.

Apart from the above, a polymeric substance miscible with the above-mentioned polypropylene type resins, such as high- and low-density polyethylenes, polybutene-1, ethylene-vinyl acetate copolymer, ethylene-propylene rubber, styrene-butadiene rubber, ethylene-ethyl acrylate copolymer, ionomer and the like, may be mixed into the above-mentioned polypropylene type resins either alone or in the form of a blend of two or more polymers, so long as polypropylene is the main component in the resulting mixture.

It is also possible to add various additives such as inorganic filler, pigment, antioxidant, ultraviolet absorber, processing aid and the like.

The reason why a polypropylene resin having such a specified melt tension is preferably used in this invention is that such a resin is small in unevenness of viscosity and gives an extruded product having a melt strength suitable for foaming so that, at the time of extrusion-foaming, cells can be uniformly formed without breakage to give a highly expanded product free from unevenness of surface.

If a polypropylene resin having a minimum melt tension smaller than 3 g, which is out of the above-mentioned range, is used, the foams break at the foaming so that no foamed product of high expansion ratio can be obtained. If a polypropylene resin having a maximum/minimum ratio of melt tension greater than 2.5 is used, unevenness due to uneven foaming appears so that a foamed product having a smooth surface state cannot be obtained.

The volatile foaming agents usable in this invention include aliphatic hydrocarbons such as pentane, butane, propane and the like; fluoro-chlorinated hydrocarbons such as dichlorotetrafluoroethane, trichlorotrifluoroethane, trichloromonofluoromethane, dichlorodifluoromethane, dichloromonofluoromethane, dibromotetrafluoroethane and the like; and so on. Among them, fluoro-chlorinated hydrocarbons are preferable in point of forming workability, non-toxicity and flame retardancy, among which a mixture consisting of 90–30% by weight of trichlorotrifluoroethane and 10–70% by weight of dichlorotetrafluoroethane is particularly preferable because it is excellent in impregnation property to polypropylene and processing stability during the extrusion foaming and can give a polypropylene foam having fine cells and a high expansion ratio.

From the viewpoint of foaming workability and quality of foamed product, the amount of foaming agent added to the polypropylene resin is preferably in the range of 5–50 parts by weight per 100 parts by weight of polypropylene resin. If the amount of foaming agent is less than 5 parts by weight, the plasticizer-like effect of the foaming agent is small, the extruded product is not easily controllable at the temperature suitable for foaming and the expansion ratio (the term "expansion ratio" herein referred to means the ratio (density of resin)/-

(density of expanded product)) cannot become high. With increasing the amount of foaming agent, temperature control becomes easier and the expansion ratio increases so that a foamed product of high expansion ratio becomes obtainable. However, if its amount exceeds 50 parts by weight, a separation between resin and foaming agent takes place in the extruder and "foaming in die" occurs, so that the surface of the expanded product becomes rough, and no good expanded product is obtainable.

As the nucleus-forming agent used in this invention for controlling dispersion and size of cells, there can be referred to inorganic substances such as calcium carbonate, talc, clay, titanium oxide, silica, barium sulfate, diatomaceous earth and the like; carbon dioxide generater by the combination of a bicarbonate or a carbonate of sodium, potassium, ammonium or the like and an inorganic or organic acid such as boric acid, citric acid, tartaric acid or the like; thermal decomposition type chemical foaming agents such as azodicarbonamide, benzenesulfonyl hydrazide, toluenesulfonyl hydrazide and the like; and so on. Among them, finely pulverized products of inorganic substances such as calcium carbonate, talc and the like are relatively preferable in that they have no restriction as to extrusion temperature.

The amount of said nucleus-forming agent may be appropriately selected from the range of 0.01–5 parts by weight per 100 parts by weight of polypropylene resin. In this range, the most preferable amount is 0.1–3 parts by weight. In general, an increased amount of nucleus-forming agent gives a smaller diameter of cell. However, if the amount exceeds 5 parts by weight, agglomeration or insufficient dispersion of nucleus-forming substance occurs, so that the diameter of the cell becomes greater. On the contrary if the amount is less than 0.01 part by weight, the nucleus-forming action is too feeble to decrease the diameter of the cells.

As the method for adding said nucleus-forming agent to polypropylene resin the dry blend method, master batch method and the like can be employed.

Since the process of this invention is a non-crosslinking extrusion foaming process, it has the following merits:

(1) By attaching various shapes of die to the tip of the extruder, a polypropylene foam having the shape of pipe, sheet, rod, etc. can be obtained as a product of continuous length.
(2) Polypropylene foam can be integrally coated on copper pipe or the like continuously by extrusion.
(3) The production process is relatively simple.
(4) As compared with crosslinked product, the product of this process can be heavy-gage.
(5) The cost of production is low.

Further, since the polypropylene foam produced by the process of this invention has a high expansion ratio and fine cells and is excellent in heat-insulating property and heat resistance, it is satisfactorily usable as heat-insulating material, buffer material and the like.

Hereunder, this invention will be illustrated in more detail with reference to the following illustrative examples which may be modified appropriately unless they exceed the scope of this invention.

In the examples, melt tension was measured by the following method.

Measurement of Melt Tension:

Using a Melt Tension Tester manufactured by Toyo Seiki, a molten polymer heated to 190° C. was extruded through an orifice having a bore diameter of 2.095 mm, a length of 8 mm and an entrance angle of 45° at a speed of 0.72 cm$^3$/min. The extruded product was passed through a tension-detecting pulley and wound up at a speed of 3 m/min. The tension at this time was detected by means of a differential transformer and recorded by means of a recorder to determine minimum value of tension (M.T. min) and maximum value of tension (M.T. max). Further, M.T. max/M.T. min was calculated as a measure of the width of variation of melt tension.

EXAMPLE 1

To 100 parts by weight of a polypropylene (melt index 0.7 g/10 min, specific gravity 0.91) having a minimum value of melt tension (M.T. min) of 5.8 g, a maximum value of melt tension (M.T. max) of 10 g at 190° C. and a M.T. max/M.T. min ratio of 1.72 was added 0.5 part by weight of talc (Micro-White ® #5000S) as a nucleus-forming agent, and the mixture was dry-blended with a Henschel mixer to obtain a compound for foaming processing.

An extrusion foaming process was practised by using an extrusion foaming apparatus wherein the first extruder (bore diameter 50 mm$\phi$, L/D=23) having a foaming agent injecting hole on its cylinder was in series connected with a second extruder (bore diameter 40 mm$\phi$, L/D=20) having a cooling oil jacket on its cylinder and its tip was connected with a static mixer (bore diameter 1 in$\phi$, element number 9).

First, the above-mentioned compound was fed at a rate of 6.4 kg/hour to the first extruder of which the temperature was adjusted to 200° C. To a region of the extruder where the compound was molten and kneaded, a mixture consisting of 80% by weight of trichlorotrifluoroethane and 20% by weight of dichlorotetrafluoroethane, as a foaming agent, was injected at a rate of 1.3 kg/hour by applying a pressure of 120 kg/cm$^2$. The kneaded mixture was fed to the second extruder through the connecting tube while maintaining its pressure at 30 kg/cm$^2$, after which it was cooled to a temperature of 158° C. and then extruded into atmospheric pressure through a pipe-forming die having an inner diameter of 2 mm and an outer diameter of 5 mm and foamed there to obtain a pipe-formed expanded product having a smooth surface and having an inner diameter of 12 mm and an outer diameter of 20 mm. The expanded product thus obtained had a density of 0.029 g/cm$^3$, a cell diameter of 0.4 mm and a good elasticity.

EXAMPLES 2–4

By using various polypropylenes in which the melt tension at 190° C. fell in the range specified in this invention, extrusion foaming was practised under the same conditions as in Example 1 to obtain pipe-formed expanded products.

Dimensions, surface states, densities and foam diameters of the expanded products were as shown in Table 1.

EXAMPLE 5

To 100 parts by weight of a polypropylene (melt index 0.2 g/10 min, specific gravity 0.91) having a M.T. min value of 7.3 g, a M.T. max value of 9.3 g at 190° C. and a M.T. max/M.T. min ratio of 1.27, was added 0.5 part by weight of talc (Micro-White ® #5000S) as a nucleus-forming agent. The mixture was dry-blended by means of a Henschel mixer to obtain a foaming processing compound.

Using the same extrusion foaming apparatus as in Example 1, the compound was fed at a rate of 5.8 kg/hour to the first extruder adjusted to 200° C. Into a region of the extruder where the compound was molten and kneaded, dichlorotetrafluoroethane was injected as a foaming agent at a rate of 1.4 kg/hour by applying a pressure of 100 kg/cm$^2$. The kneaded mixture was fed to the second extruder through the connecting tube while keeping the kneaded mixture at a pressure of 25 kg/cm$^2$, after which the kneaded mixture was cooled to a temperature of 156° C. and then extruded into the atmospheric pressure through a pipe-forming die having an inner diameter of 2 mm and an outer diameter of 5 mm and foamed there to obtain a pipe-formed expanded product having smooth surface and having an inner diameter of 11 mm and an outer diameter of 21 mm.

The expanded product thus obtained had a density of 0.026 g/cm$^3$, a cell diameter of 0.6 mm and a good elasticity.

COMPARATIVE EXAMPLE 1

Using a polypropylene (melt index 0.3 g/10 min, specific gravity 0.91) having a M.T. min value of 4.5 g, a M.T. max value of 16.1 g at 190° C. and a M.T. max/M.T. min ratio of 3.58, an extrusion foaming process was practised under the same conditions as in Example 1. As the result, uneven foaming took place, and nothing was obtained other than a product having an uneven surface.

The expanded product had an inner diameter of 8-12 mm, an outer diameter of 19-25 mm, a density of 0.028 g/cm$^3$ and a cell diameter of 0.4 mm.

COMPARATIVE EXAMPLE 2

Using a polypropylene (melt index 3.0 g/10 min, specific gravity 0.91) having a M.T. min value of 1.6 g, a M.T. max value of 3.5 g at 190° C. and a M.T. max/M.T. min ratio of 2.19, an extrusion foaming process was practised under the same conditions as in Example 1. As the result, the surface was roughened due to the breakage of cells at the time of foaming and cavities were formed due to the coarse and large cells, so that no good expanded product was obtained.

COMPARATIVE EXAMPLE 3

Using a polypropylene (melt index 0.7 g/10 min, specific gravity 0.91) having a M.T. min value of 1.8 g, a M.T. max value of 8.2 g at 190° C. and a M.T. max/M.T. min ratio of 4.56, an extrusion foaming process was practised under the same conditions as in Example 1. As the result, the surface was roughened due to breakage of cells, cavities were formed due to the coarse and large cells and unevenness appeared on the surface due to the uneven foaming, so that no good expanded product was obtained.

TABLE 1

| | Sample polypropylene | | | | Foamed product | | | | |
|---|---|---|---|---|---|---|---|---|---|
| | M.I. (g/10 min) | M.T.min (g) | M.T.max (g) | M.T.max/M.T.min | Inner diameter (mm) | Outer diameter (mm) | Surface state | Density (g/cm$^3$) | Cell diameter (mm) |
| Example 1 | 0.7 | 5.8 | 10 | 1.72 | 12 | 20 | Smooth | 0.029 | 0.4 |
| Example 2 | 1.0 | 4.5 | 6.8 | 1.51 | 11 | 18 | " | 0.036 | 0.45 |
| Example 3 | 0.25 | 8.6 | 17.7 | 2.06 | 10 | 22 | " | 0.023 | 0.4 |
| Example 4 | 0.5 | 10.3 | 15.9 | 1.54 | 11 | 21 | " | 0.025 | 0.35 |
| Example 5 | 0.2 | 7.3 | 9.3 | 1.27 | 11 | 21 | " | 0.024 | 0.6 |
| Comparative Example 1 | 0.3 | 4.5 | 16.1 | 3.58 | 8-12 | 19-25 | Unevenness | 0.028 | 0.4 |
| Comparative Example 2 | 3.0 | 1.6 | 3.5 | 2.19 | 10 | 17 | Roughened surface | 0.041 | Coarse cell, Formation of cavity |
| Comparative Example 3 | 0.7 | 1.8 | 8.2 | 4.56 | 7-12 | 17-20 | Roughened surface Unevenness | 0.057 | Coarse cell, Formation of cavity |

What is claimed is:

1. A non-crosslinking extrusion foaming process for producing a polypropylene highly foamed product which consists essentially of feeding a polypropylene resin having, at 190° C., a minimum value of melt tension of 3 g or more and a maximum/minimum ratio of melt tension of 2.5 or less into an extruder together with a nucleus-forming agent, melting them, thereafter feeding a volatile foaming agent into the barrel of the extruder, uniformly mixing the materials, and then extruding the mixture to a low pressure zone while cooling the mixture.

2. A process for producing a polypropylene highly foamed product according to claim 1, wherein said polypropylene resin has, at 190° C., a minimum value of melt tension of 5 g or more and a maximum/minimum ratio of melt tension of 2.0 or less.

3. A process for producing a polypropylene highly foamed product according to claim 1, wherein said volatile foaming agent is a mixture consisting of 90-30% by weight of trichlorotrifluoroethane and 10-70% by weight of dichlorotetrafluoroethane.

4. A foamed polypropylene product produced by the process of claim 1.

5. A foamed polypropylene product produced by the process of claim 2.

6. A foamed polypropylene product produced by the process of claim 3.

* * * * *